US008011307B2

(12) United States Patent  (10) Patent No.: US 8,011,307 B2
Marcelli  (45) Date of Patent: Sep. 6, 2011

(54) RETRACTABLE ANTIFRICTION BEARINGS DEVICE FOR A LOADING BED AND LOADING BED EQUIPPED WITH SUCH A DEVICE

(75) Inventor: Pierre Marcelli, Laveze (FR)

(73) Assignee: Rotobloc PSP (SARL), Pirey (FR)

( * ) Notice: Subject to any disclaimer, the term of this patent is extended or adjusted under 35 U.S.C. 154(b) by 303 days.

(21) Appl. No.: 12/280,211

(22) PCT Filed: Feb. 16, 2007

(86) PCT No.: PCT/FR2007/000283
§ 371 (c)(1),
(2), (4) Date: Aug. 21, 2008

(87) PCT Pub. No.: WO2007/099213
PCT Pub. Date: Sep. 7, 2007

(65) Prior Publication Data
US 2009/0020046 A1    Jan. 22, 2009

(30) Foreign Application Priority Data
Feb. 28, 2006 (FR) ...................................... 06 01746

(51) Int. Cl.
*B65D 19/44* (2006.01)
(52) U.S. Cl. .................................. 108/55.3; 193/35 MD
(58) Field of Classification Search .................. 108/55.3, 108/55.1, 51.11, 57.15; 193/35 SS, 35 MD
See application file for complete search history.

(56) References Cited

U.S. PATENT DOCUMENTS

| 2,944,684 | A |   | 7/1960 | Dennis |
| 3,739,894 | A | * | 6/1973 | Hinman ................ 193/35 MD |
| 4,285,550 | A | * | 8/1981 | Blackburn et al. ............... 384/49 |
| 4,347,794 | A | * | 9/1982 | Nordstrom ................. 108/57.15 |
| 4,553,795 | A | * | 11/1985 | Takagi ..................... 193/35 MD |
| 4,696,583 | A | * | 9/1987 | Gorges ................... 193/35 MD |
| 4,732,490 | A | * | 3/1988 | Masciarelli ............. 193/35 MD |
| 4,784,194 | A | * | 11/1988 | Danner ........................ 108/55.3 |
| 4,871,052 | A | * | 10/1989 | Huber ..................... 193/35 MD |
| 5,219,058 | A | * | 6/1993 | Sundseth ................ 193/35 MD |
| 5,516,211 | A | * | 5/1996 | Barnes et al. ........... 193/35 MD |
| 6,164,429 | A | * | 12/2000 | Masciarelli, Jr. ......... 193/35 SS |
| 6,279,716 | B1 |   | 8/2001 | Kayatani et al. |
| 6,457,865 | B1 | * | 10/2002 | Masciarelli, Jr. ....... 193/35 MD |
| 6,786,318 | B1 |   | 9/2004 | Pace et al. |

FOREIGN PATENT DOCUMENTS

| AU | 56974 73 | 12/1974 |
| AU | 502 012 | 7/1979 |
| EP | 0 387 168 | 9/1990 |

\* cited by examiner

*Primary Examiner* — Jose V Chen
(74) *Attorney, Agent, or Firm* — Davis & Bujold, P.L.L.C.

(57) ABSTRACT

A retractable antifriction bearing device (10*a*) that can be housed in a standardized groove of a loading bed. Each ball (30) is mounted directly in a housing (21*a*) of the profile (20*a*) by a guide and sealing ring (50) provided with a spherical cavity (53) that complements the ball (30) to hold the ball in position with respect to the housing (21*a*). A bearing guide (60*a*) is also mounted directly in the housing (21*a*) and is provided with a cup (61) guiding the ball (30) in rotation via a bed of small balls (62). This bearing guide (60*a*) is spring-loaded by spring elements (40*a*) so as to urge the ball (30) into the working position in which the ball bears the load (2).

19 Claims, 6 Drawing Sheets

RETRACTABLE ANTIFRICTION BEARINGS DEVICE FOR A LOADING BED AND LOADING BED EQUIPPED WITH SUCH A DEVICE

TECHNICAL REALM

The present invention concerns a retractable bearings device for a loading bed to facilitate the displacement and/or positioning of heavy loads in a transfer plane parallel to said loading bed, said device comprising a profile equipped with balls and displacement means for displacing these balls between a working position, in which they project from said profile so as to support said load, and a resting position in which they are retracted inside said profile and no longer support said load. The invention also concerns a loading bed equipped with such a bearings device.

PRIOR ART

These loading beds are widely used throughout numerous industrial domains. They generally equip machine tools, punching machines, forming machines, stamping machines, as well as forges, injection presses for plastics, composites, or the like. They are used specifically to displace and position heavy loads such as tools, molds, parts, etc., which may weigh as much as several tons. In order to be able to displace these heavy loads, the loading beds are equipped with retractable bearings devices. They generally consist of grooves that are parallel or perpendicular to one another, T-shaped, I-shaped, or some similar shape, capable of receiving these bearings devices called segments or bars, equipped with retractable bearings devices. These bearings devices may be rollers allowing displacement in a single direction or balls allowing displacement in all directions. The present invention specifically concerns the balls.

Each ball is integrated within a bearing module comprising a body equipped with a cup having a spherical cavity to support the ball using a bed of small balls. This ball is held by a cap set into or attached to the body to form a non-removable monoblock bearings module. These bearings modules are housed in blind housings on the segment and controlled by mechanical or hydraulic displacement means to move between a resting position in which they are retracted and the load is supported by the bed and remains immobile, and a working position in which they project from the bed surface and the load is supported by the bearings and can be displaced with no friction. Such bearing modules are described in publications EP 0 387 168, U.S. Pat. No. 6,279,716, AU 56,974, AU 502,012, U.S. Pat. No. 6,786,318.

The grooves in the loading bed are generally standardized and narrow in width. It is therefore very difficult to make bearings modules that perform well and are also reliable and economical, given the small space available inside the grooves. The diameter of the balls and of the smaller balls is limited, thus restricting the maximum load that can be supported. Moreover, it is difficult or even impossible to keep these bearings modules free of dust, particles, and any type of pollution, since the position occupied by the cap does not permit a tight seal to be inserted. In addition, the ball supported by the bed of balls is not always dependably centered. When moving, the ball may be displaced and become unbalanced, causing a risk of blockage and damaging the bearings module. Consequently, bearing performance is limited and there is a high risk that the modules may deteriorate when the ball becomes off balance and/or if harmful particles are accidentally introduced inside the modules.

DESCRIPTION OF THE INVENTION

The aim of the present invention is to resolve this problem by proposing a retractable bearings device that can be housed in a normal width groove on a loading bed, wherein the diameter of both the balls and the small balls is increased, there is an effective integral seal surrounding the balls to prevent the introduction of particles or any type of pollution, liquid or solid, into the device, and centering of the balls is ensured. This results in a device that is very economical, with superior performance in terms of bearing and maximal load supported, and improved reliability and lifespan.

To this end, the invention comprises a bearings device of the type indicated in the preamble, characterized in that each ball is mounted in a housing in said profile using a guide and sealing ring having a spherical cavity complementing the shape of the ball and large enough to cover it over a span extending from one side of the transverse median plane of said ball to the other in order to maintain it in position relative to said housing, and in that said guide and sealing ring comprises a means for forming a seal between the ball and said housing.

This design eliminates the conventional bearings module, along with the body and cap constituting said module, thereby expanding the space available inside the profile for attaching said guide and sealing ring, in particular, while at the same time increasing the diameter of the ball and of the small balls and providing a larger area for them to circulate.

The guide and sealing ring may comprise integrated sealing means in the form of peripheral raised areas, or attached seals.

The guide and sealing ring may be attached within the housing with enough play for it to be axially displaced relative to the housing. In this case the housing comprises at least one axial stop to limit the course of the guide and sealing ring at least in the direction of the exit to the housing.

This guide and sealing ring may be made of a single piece of flexible material, said ball being attached with force inside said spherical cavity, or it may be made of rigid material from at least two pieces joined on either side of the ball.

Advantageously the device comprises for each ball, a bearing guide mounted in the housing of the profile, designed to move in axial translation under the influence of the displacement means, said bearing guide being equipped with a cup to guide the ball in rotation using a bed of small balls which have a larger area to circulate. In this case the housing comprises at least one axial stop to limit the course of the bearing guide at least in the direction of the exit to the housing.

In a first embodiment the displacement means are mechanical and they comprise spring elements in each housing, which urge said ball into the working position.

In a second embodiment the displacement means are hydraulic and they comprise a chamber in each housing supplied with pressurized fluid in which a piston is displaced and cooperates with the bearing guide to urge said ball into the working position. In this case the device comprises a hydraulic circuit connected to a pressurized fluid supply and communicating with all the chambers.

In a third embodiment the displacement means are hydraulic and they comprise in each housing a piston which, together with said ball, defines a chamber supplied with pressurized fluid so as to create a fluid bed guiding the balls in rotation.

In a preferred embodiment, the displacement means comprises a valve controlling the fluid pressure inside the chambers, said valve being advantageously formed in the upstream piston, and a hydraulic circuit connected to a supply of pressurized fluid and communicating with all the chambers through said valve.

Said valve may comprise a clapper mounted in an interior channel of the upstream piston, which is opened by said ball in resting position.

To this end, the invention also comprises a loading bed which comprises bearings devices as defined above, the profiles of said bearings devices being fixed relative to said bed or movable in a direction perpendicular to the surface of the bed.

SUMMARY DESCRIPTION OF THE DRAWINGS

The present invention and its advantages will be more apparent from the following description of the several embodiments provided by way of non-limiting examples, with reference to the attached drawings, in which.

ILLUSTRATIONS OF THE INVENTION

With reference to the drawings, the retractable bearings device 10a-c of the invention is mounted on a loading bed 1 to facilitate the displacement and/or positioning of heavy loads 2 in a transfer plane T parallel to the surface S of loading bed 1 and generally horizontal. This retractable bearings device 10a-c comprises a profile 20a-c equipped with balls 30 and displacement means 40a-c designed to displace balls 30 between a working position in which they project from the bed surface S so as to raise load 2, which can then be displaced by moving it with no friction in transfer plane T, and a resting position in which they are retracted from the bed surface S, with load 2 being immobilized and remaining on loading bed 1. Loading bed 1 comprises, in known manner, along all or a portion of its surface S, a defined number of standardized grooves 3 that are parallel or perpendicular to one another, each groove 3 receiving the sliding or interlocking profile 20a-c of a retractable bearings device 10a-c which is shorter in height than the depth of groove 3. Each profile 20a-c comprises a defined number of housings 21a-c, preferably at regular intervals, open at the top and oriented perpendicular to the surface of loading bed 1. In the drawings and to aid comprehension of the invention, only a portion of retractable bearings device 10a-c is depicted, showing only two or three balls 30. It should be clear that in actuality this device comprises a variable number of balls 30 depending upon its length and the load to be supported.

The distinguishing feature of the invention resides in the fact that balls 30 are mounted directly inside housings 21a-c of profile 20a-c using a guide and sealing ring 50 that is independent and self-supporting to maintain each ball 30 in the axial and transverse positions relative to housing 21a-c.

Each guide and sealing ring 50 comprises seals known as exterior seals 51 located between guide and sealing ring 50 and housing 21a-c, and sealing means known as interior seals 52 located between the guide and sealing ring 50 and ball 30. Sealing means 51, 52 may form an integral part of the guide and sealing ring 50 and consist of raised peripheral areas such as bumps, flanges, lips, or the like. They may also be elements attached to the guide and sealing ring 50 and may consist of toric seals as shown, lips, flanges, or the like housed in appropriately shaped grooves formed in the exterior or interior perimeters corresponding to guide and sealing rings 50. The exterior perimeter of the guide and sealing ring 50 is complementary to housing 21a-c and preferably cylindrical. Guide and sealing ring 50 comprises a spherical cavity 53 complementary to ball 30 and covering it over an area extending from either side of the transverse median plane of ball 30 perpendicular to the axis of housing 21a-c. Because of its design, the guide and sealing ring 50 fulfills several functions: it supports ball 30, positions and guides it within housing 21a-c, and keeps it centered on the axis of this housing, while simultaneously forming a seal between the ambient milieu and the interior of housing 21a-c. Depending upon whether the guide and sealing ring 50 is made of flexible or rigid material, it may be made either of a single piece or of at least two pieces joined by some appropriate means. In the first case, ball 30 is forcibly attached inside the guide and sealing ring 50 by deforming it and in the second case, the guide and sealing ring 50 is assembled around ball 30.

Figure 1A:
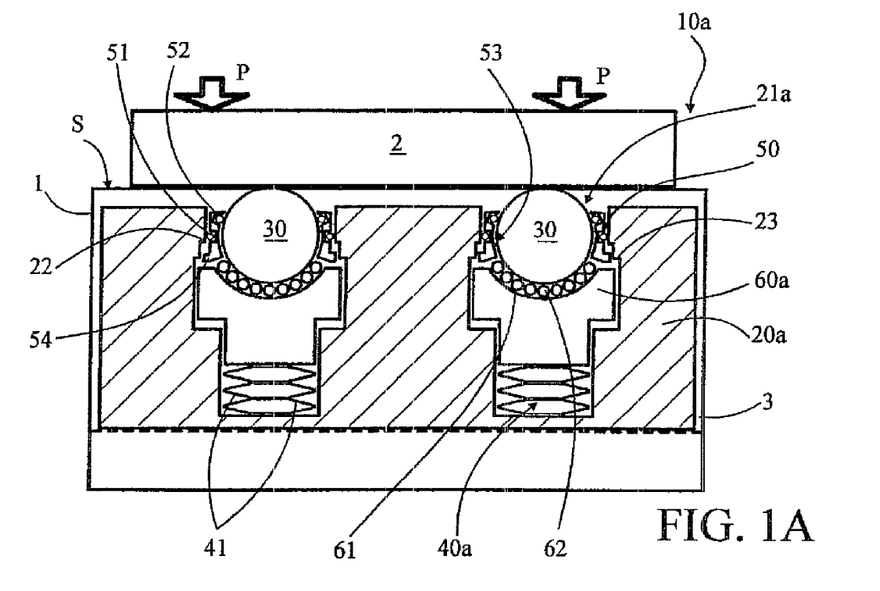
FIGS. 1A and 1B are schematic longitudinal cross-sections of a first embodiment of the bearings device of the invention in a loading bed, in the resting and working positions, respectively.
Figure 1B:
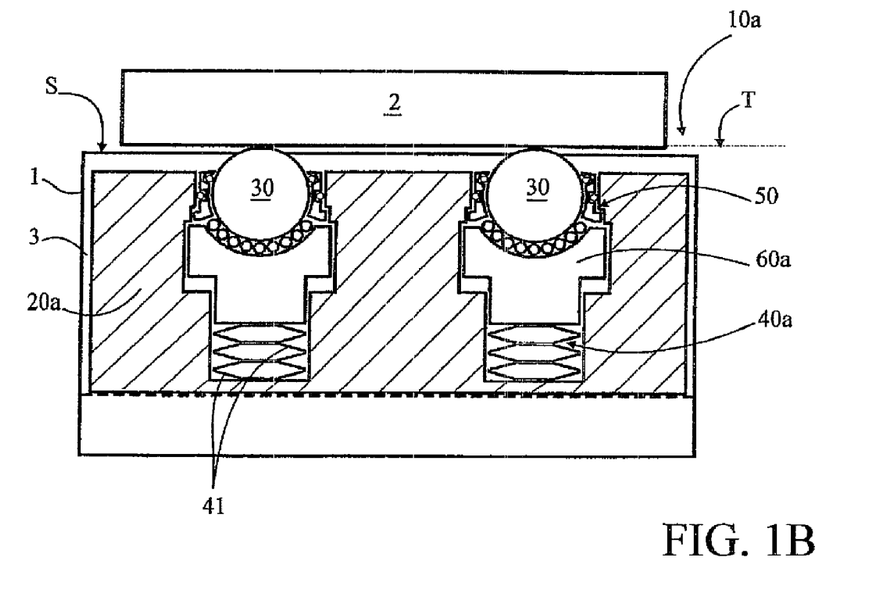
Figure 3:
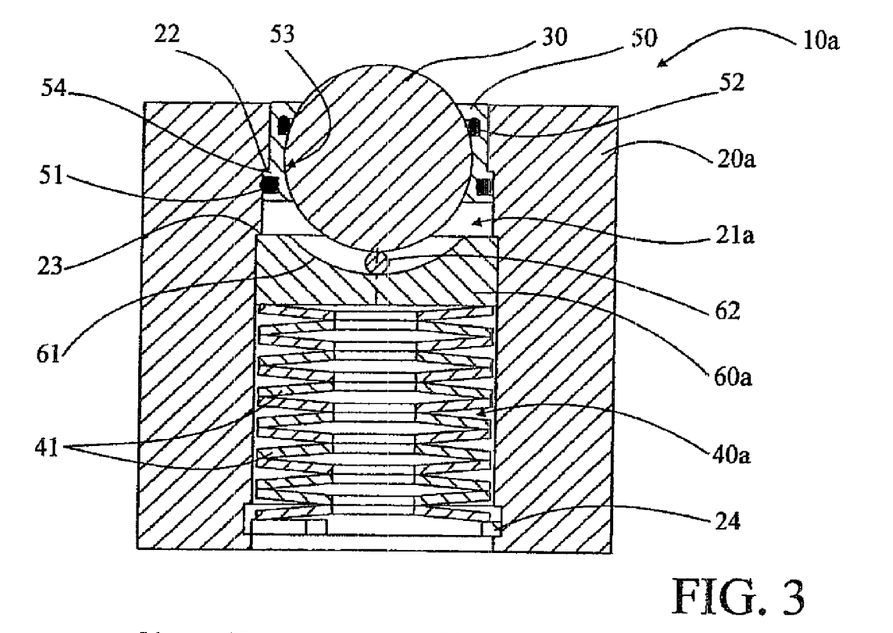
FIGS. 3 and 4 are axial cross-sections of the bearings device of the first and second embodiments, respectively.

In retractable bearings device 10a shown in FIGS. 1A, 1B and 3, profile 20a is permanently attached inside groove 3 of loading bed 1 and balls 30 move between at least the working and resting positions. For this reason each guide and sealing ring 50 supporting a ball 30 is attached inside a housing 21a of profile 20a leaving some play to allow it to be axially displaced inside said housing 21a. Housing 21a comprises a first axial stop 22 limiting the course of the guide and sealing ring 50 in at least the direction of the exit to housing 21a in order to define the maximum extended position of ball 30. This first axial stop 22 is formed of a shoulder or similar shape cooperating with a flange 54 or similar element on the guide and sealing ring 50.

Each bearing device 30 is guided in rotation by a bearing guide 60a mounted directly in housing 21a of profile 20a, urged in axial translation by displacement means 40a. This bearing guide 60a comprises a spherical cup 61 adapted to the diameter of ball 30 and designed to guide and support it using a bed of small balls 62 or some other equivalent means. These small balls 62 utilize a small travel area defined by bearing guide 60a, ball 30, guide and sealing ring 50, and housing 21a. This travel area is larger than in prior art devices due to the elimination of the body and cap of conventional bearings modules, allowing them to have an increased diameter.

In this first embodiment displacement means 40a are mechanical and they comprise spring elements 41 such as a stack of Belleville® discs or the like, located between the base of blind housing 21a or defined by one disc 24 and the base of bearing guide 60a so as to urge ball 30 into the exit position. Bearing guide 60a is consequently guided in axial translation by the interior walls of housing 21a. This housing 21a comprises a second axial stop 23 in the form of a shoulder or similar shape cooperating with bearing guide 60a to limit its course at least toward the exit of housing 21a.

The maximum retracted position of ball 30 can be defined by spring elements 41 themselves when compressed, or by other axial stops provided in housing 21a of profile 20a to limit the course of ball 30 and/or bearing guide 60 toward the base of said housing 21a.

When it is empty, balls 30 of this retractable bearings device 10a are in the maximum extended position, projecting from surface S of loading bed 1, the guide and sealing ring 50 is in the upper position defined by first axial stop 22, bearings guide 60a is in the upper position defined by ball 30, and spring elements 41 are extended.

With a normal load, if the weight of load 2 is less than or equal to the recall force of spring elements 41 as shown in FIG. 1B, with balls 30 sinking slightly, simultaneously displacing guide and sealing ring 50 and bearing guide 60 and slightly compressing spring elements 41. They remain extended in working position to support load 2, which may be displaced and/or positioned by moving it with no friction along transfer plane T defined by these same balls 30.

When overloaded, for example under the influence of pressure P, if the weight of load 2 becomes greater than the recall force of spring elements 41, as shown in FIG. 1A, balls 30 retract inside housing 21a into the resting position in which they remain in contact with load 2, the latter resting on loading bed 1. When balls 30 retract, they take with them guide and sealing ring 50 and bearing guide 60a, and they compress spring elements 41.

Figure 2A:
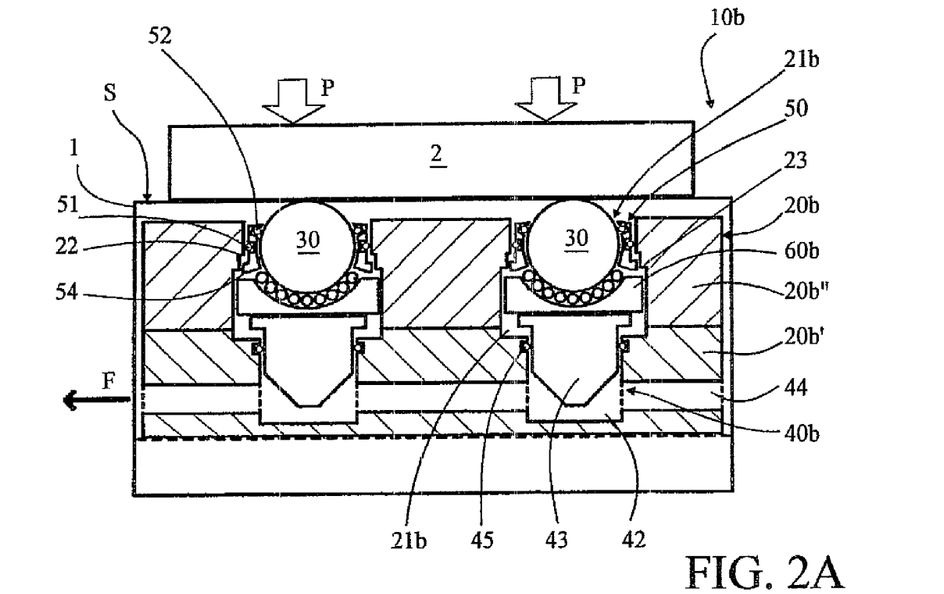
FIGS. 2A and 2B are views similar to FIGS. 1A and 1B showing a second embodiment.
Figure 2B:
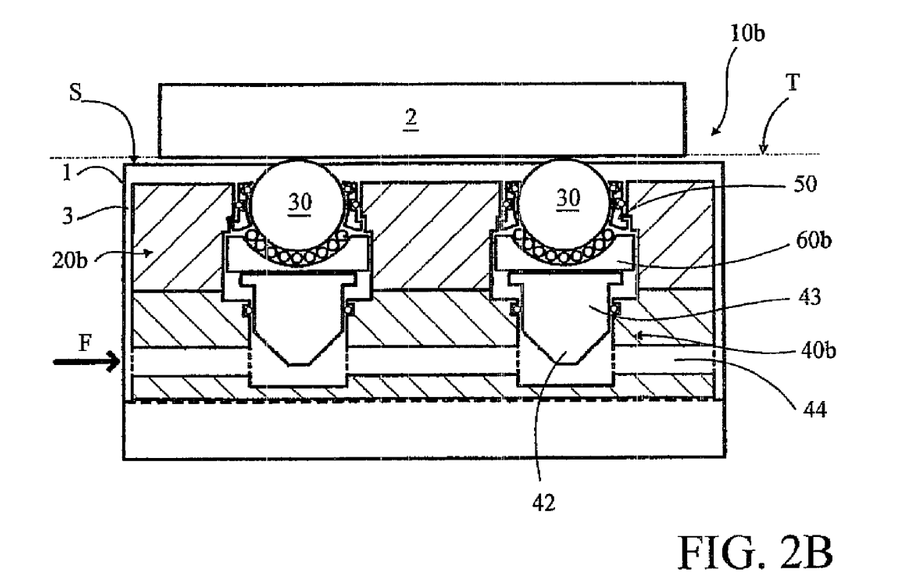
Figure 4:
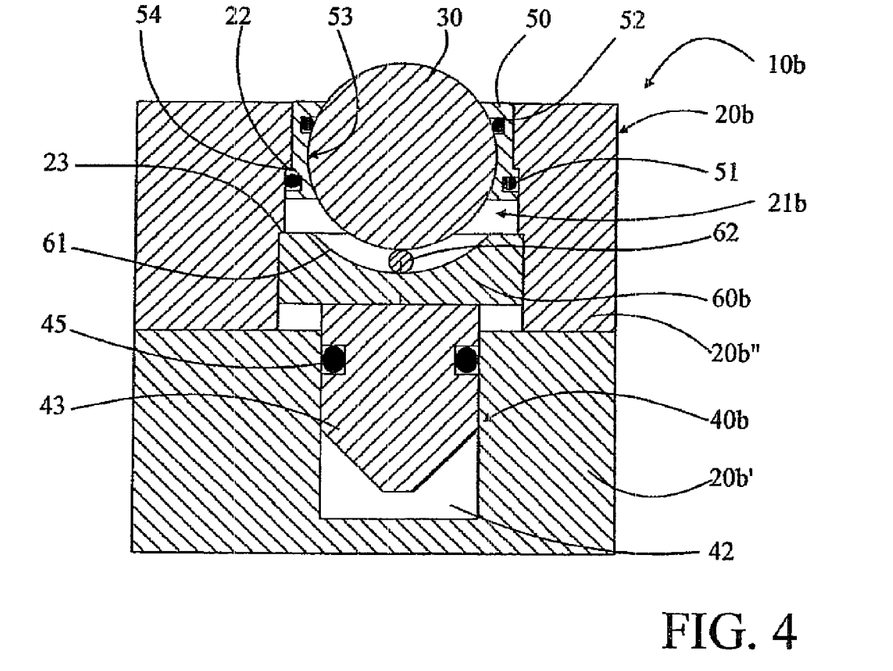

In retractable bearings device 10b shown in FIGS. 2A, 2B and 4, profile 20b is also affixed to the inside of groove 3 of loading bed 1, with balls 30 moving between the working and resting positions. The attachment of guide and sealing ring 50 in housing 21b of profile 20b is similar to before and will not be described further, nor will the method for guiding ball 30 in rotation using bearing guide 60b.

In this second embodiment the displacement means 40b is hydraulic and it comprises in each housing 21b a chamber 42 supplied with pressurized fluid F in which a piston 43 connected to bearing guide 60b is displaced. Profile 20b comprise a conduit 44 connected to a pressurized fluid supply F (not shown) forming a hydraulic circuit that extends longitudinally to communicate with all the chambers 42 so as to supply them simultaneously. Piston 43 is guided in axial translation by the walls of chamber 42. Formation of a hydraulic seal relative to the rest of housing 21b is ensured by one or more sealing devices 45 such as a toric seal or the like, housed in a groove formed on the periphery of chamber 42 and/or piston 43. The shape of the base of piston 43 is generally conical or truncated, increasing the surface contacting the pressurized fluid.

In this embodiment profile 20b is made of two joined pieces: a lower piece 20b' comprising chambers 42 and conduit 44, and an upper piece 20b" comprising housings 21b protecting bearing elements 30 maintained by guide and sealing rings 50 and supported by bearing guides 60b. Bearing guides 60b and pistons 43 may be formed of a single piece or two pieces that are joined or simply superimposed. The maximum retracted position of ball 30 is limited by the shoulder between piston 43 and bearing guide 60b abutting the lower portion 20b' of profile 20b.

When empty and with fluid pressure F present, balls 30 in this retractable bearing guide 10b are in the maximum extended position, with guide and sealing ring 50 in the upper position limited by first axial stop 22, bearing guide 60b in the upper position limited by ball 30, and piston 43 pressed against it. Balls 30 project from surface S of loading bed 1.

When loaded, if the pressure of fluid F is higher than or equal to the weight of load 2, as illustrated in FIG. 2B, balls 30 remain extended in the working position so as to support load 2, which may be displaced and/or positioned by moving it without friction in transfer plane T defined by these same balls 30.

When loaded, if the pressure of fluid F diminishes and becomes lower than the weight of load 2 as shown in FIG. 2A, balls 30 retract inside housing 21b in the resting position in which they remain in contact with load 2, the latter resting on loading bed 1. When balls 30 retract, they take with them guide and sealing ring 50, bearing guide 60b, and piston 43.

Best Way to Achieve the Invention:

In retractable bearings device 10c, shown in FIGS. 5A-C and 6A-C, profile 30c can move inside of groove 3 on loading bed 1 at least between the working and resting positions, and balls 30 are affixed in profile 20c. For this purpose, each guide and sealing ring 50 supporting a bearing element 30 is mounted in a housing 21c in profile 20c and blocked in the upper position against the first axial stop 22 by a disc stop 55 (see FIG. 6B, 6C).

In the third embodiment the displacement means 40c are hydraulic and are also designed to guide balls 30 in rotation on a bed of pressurized fluid F2. They comprise in each transverse housing 21c, a piston 46 resting against the base of groove 3 in loading bed 1, said piston 46 defining along with ball 30 a first chamber 47 supplied with pressurized fluid F2 to create the bed of fluid. Each housing 21c comprises a second chamber 48 supplied with pressurized fluid and within which piston 46 is displaced. This second chamber 48 forms a ring around piston 46 and it is hydraulically sealed by sealing means 45 such as toric seals or the like, housed in grooves formed on the periphery of second chamber 48 and/or piston 46 on either side of first conduit 71 described below. Said piston 46 comprises an interior channel 49, which may be L-shaped for example, designed to allow communication between said second chamber 48 and the first chamber 47 in the same housing 21c.

Displacement means 40c also comprises a valve 70 for controlling fluid pressure inside chambers 47, 48. For this reason, said valve 70 is located in first housing 21c or the housing upstream of profile 20c which communicates directly with the pressurized fluid supply source F1 (not shown). In the example shown said valve 70 is housed inside interior channel 49 of upstream piston 46. The inlet of this valve 70 communicates with the pressurized fluid supply source F1 through the second chamber 48 and a first conduit 71 provided in profile 20c. In this example, first conduit 71 extends longitudinally through profile 20c and communicates with all the second chambers 48 except the chamber in second housing 21c. For this reason, a block 73 is placed in said first conduit 71 between the first and second housings 21c to prevent the passage of pressurized fluid F1 and force it through valve 70. The outlet of this valve 70 communicates with first chamber 47 of first housing 21c and then with first chamber 47 of second housing 21c, short-circuiting block 73, through a second conduit 72 provided in profile 20c. Said valve 70 comprises a clapper 74, for example a ball or similar element, urged against a seating 75 in the closed position by a recall device 76. This clapper 74 is urged into the open position by corresponding ball 30 through a control piece 77, for example, a needle. Clapper 74, its recall device 76 and its control piece 77 are axially aligned inside the piston 46 and ball 30.

In this embodiment, profile 20c is made of two connected pieces: a lower piece 20c' comprising second chambers 48, first conduit 71 and block 73, and an upper portion 20c" comprising housings 21c protecting balls 30 held by guide and sealing rings 50, first chambers 47 and second conduit 72. The maximum extended position of profile 20c is defined by the shoulder of piston 47 abutting its lower portion 20c.'

In a variation not shown, the upper portion 20c" of profile 20c comprises conduit 72 which extends longitudinally to communicate with all the chambers 47. In this case lower portion 20c' comprises an opening forming conduit 71 extending only between the source of pressurized fluid and the inlet of valve 70. Also in this case, block 731 second chambers 48, and a portion of their seal elements 45 are eliminated, as well as interior conduits 49 of pistons 46.

Figure 5A:
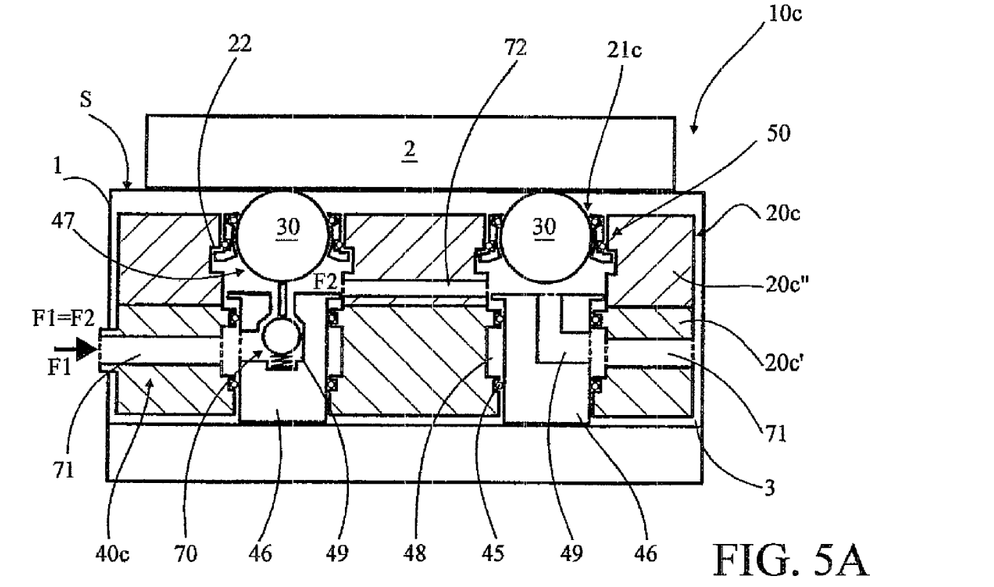
FIGS. 5A-C are schematic longitudinal cross-sections of a third embodiment of the bearings device of the invention in a loading bed in the resting, equilibrium, and working positions, respectively.
Figure 5B:
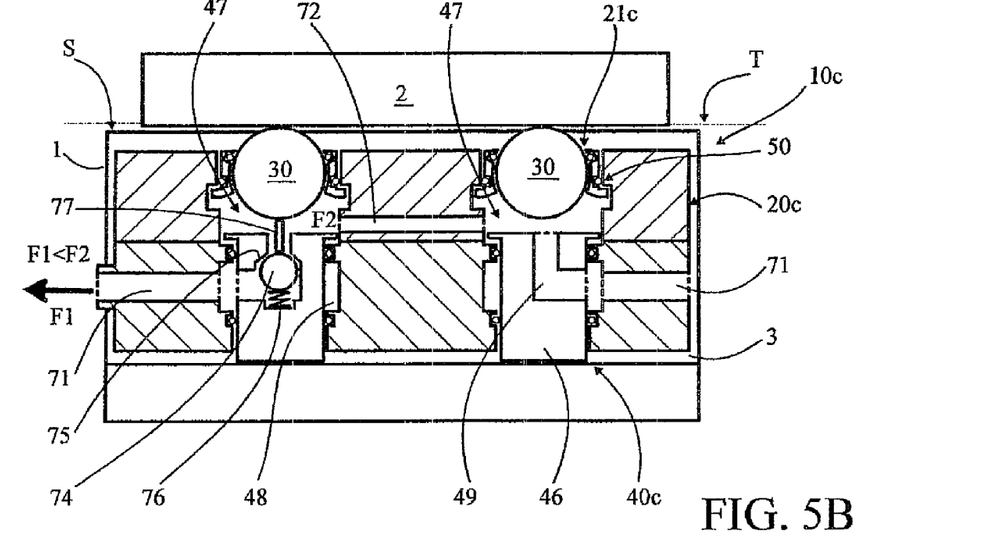
Figure 5C:
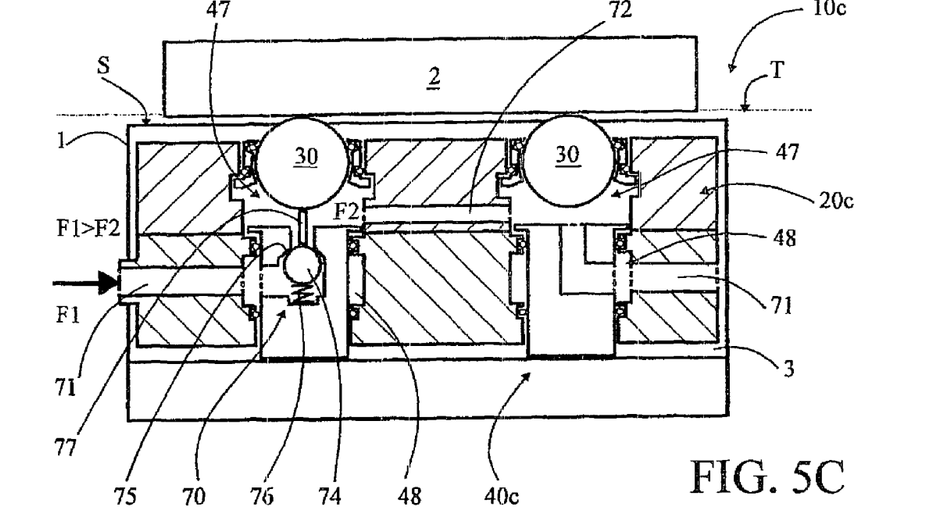
Figure 6A:
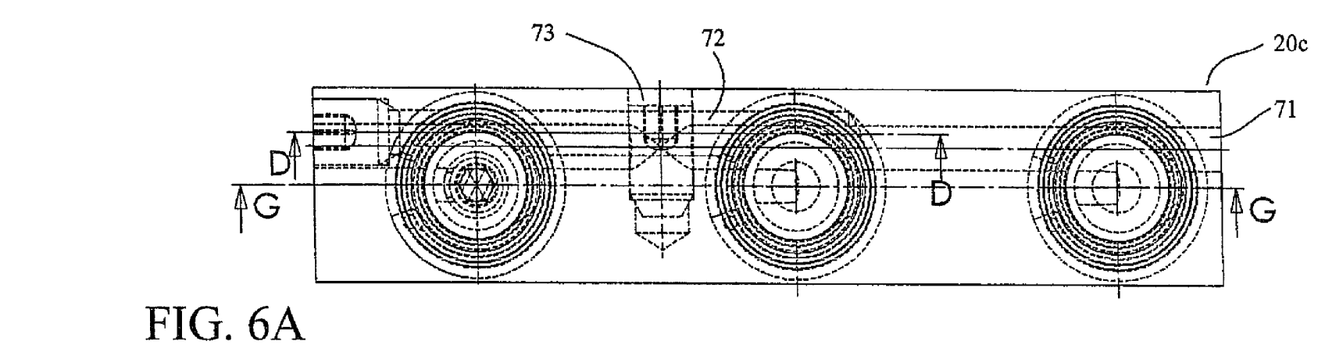
FIGS. 6A-C are views of the bearings device according to the third embodiment from the top, along cross-section GG and cross-section DD, respectively.
Figure 6B:
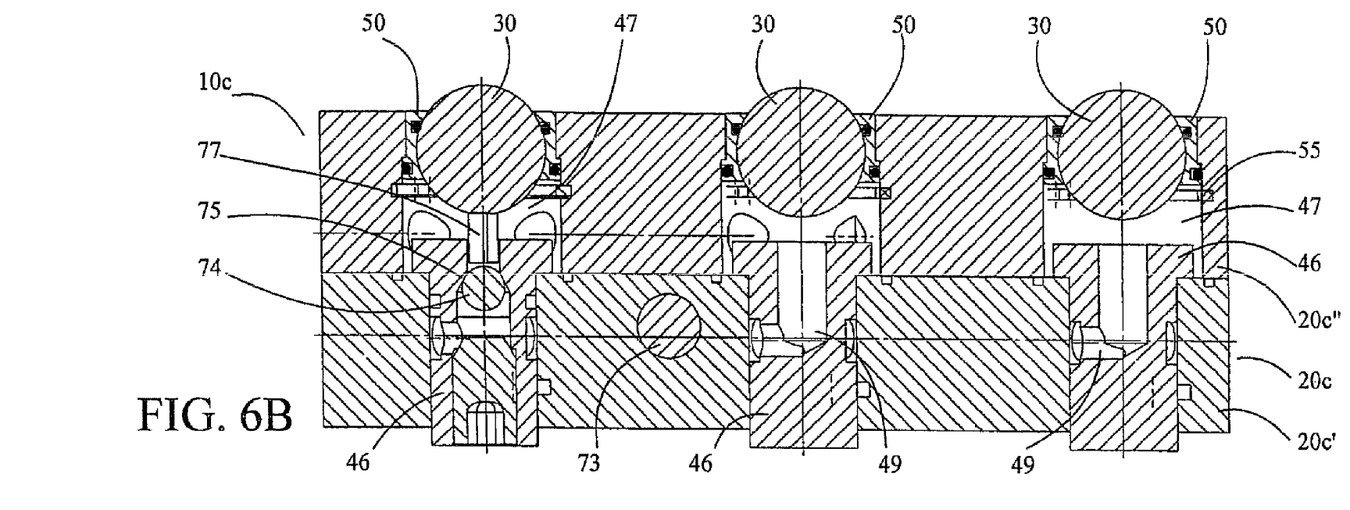
Figure 6C:
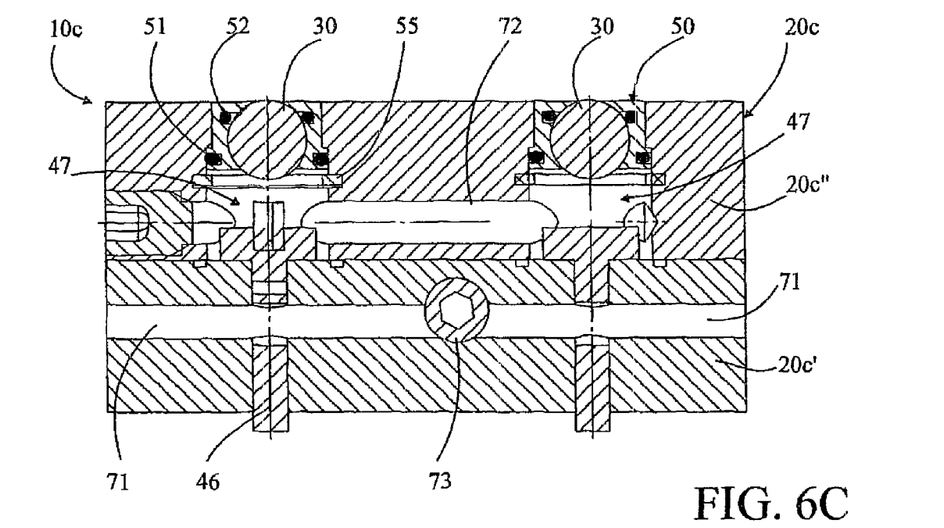

Possibilities for Industrial Application:

When empty and with no fluid pressure (F1=F2=0), profile 20c of this retractable bearings device 10c is in the retracted position, with the base of groove 3 defining its maximum retracted position. Valve 70 is open, clapper 74 being pushed away from its seating 75 by control piece 77 on which ball 30 rests. First chambers 47, second chambers 48, first conduit 711 second conduit 72 and interior channels 49, which form the hydraulic circuit, are in communication and pressure is nil.

When loaded, if the fluid pressure F1 increases but remains lower than the weight of load 2 as shown in FIG. 5A, with valve 70 having been opened through the action of ball 30, the hydraulic circuit is charged at the same pressure at all points (F1=F2). Profile 20c becomes slightly raised in the resting position, in which balls 30 are in contact with load 2, the latter resting on loading bed 1.

When loaded, if fluid pressure F1 increases and becomes higher than the weight of load 2, as shown in FIG. 5C, the hydraulic circuit increases in pressure F2, raising profile 20c into the working position in which balls 30 support load 2, which can be displaced and/or positioned by moving it with no friction in the transfer plane T defined by these same balls 30 supported by a bed of pressurized fluid F2. Upstream ball 30, by moving away from upstream piston 46, provokes the closing of valve 70 since control piece 77 no longer exerts pressure on clapper 74. Fluid pressure F2 remains present in the hydraulic circuit so long as valve 70 remains in closed position, that is, so long as fluid pressure F1 at the source remains higher than F2. The device is in the equilibrium position.

When loaded, if fluid pressure F1 at the source diminishes and becomes lower than fluid pressure F2 in the hydraulic circuit, as shown in FIG. 5B, the disequilibrium provokes the opening of valve 70, which causes a drop in fluid pressure F2 in the hydraulic circuit. Profile 20c moves downward under the weight of load 2 resting on balls 30. Upstream ball 30, by approaching upstream piston 46, exerts pressure on control piece 77 which maintains clapper 74 in the open position.

Retractable bearings device 10a-c of the invention may be made using any suitable method and any adequate material. Profile 20a-c may be made of extruded aluminum and housings 21a-c may be machined. Guide and sealing rings 50 may be made of flexible synthetic material with a high coefficient of friction or machined steel with good resistance to high temperatures, depending upon the application. Bearing guides 60a, 60b, and pistons 43, 46 may be made of machined steel. The diameter of the piston will preferably be equal to the diameter of ball 30 for purposes of pressure equilibrium.

During use, the interior of the retractable bearings device 10a-c according to the invention is effectively protected from all exterior pollution by guide and sealing rings 50. The presence of these guide and sealing rings 50 makes it possible to achieve a totally hydraulic embodiment, like the one illustrated by FIGS. 5 and 6, which was not possible with state-of-the art devices. This totally hydraulic embodiment has the advantage of eliminating the bed of small balls that were the source of malfunctions. Moreover, the hydraulic pressure P2 prevailing in the hydraulic circuit automatically lubricates balls 30. The slight leaks that may occur near the guide and sealing rings 50 offer additional protection against exterior pollution, as they provide an automatic cleaning system for the exterior of the device. These possible leaks thus protect the hydraulic circuit from any excess pressure.

Therefore, it is clear from this description that the invention achieves all the stated goals. The present invention is not limited to the exemplary embodiments described, but extends to any modification and variation obvious to a person skilled in the art while remaining within the scope of protection defined by the attached claims.

The invention claimed is:

1. A retractable bearing device (10a-c) for a loading bed (1) to facilitate at least one of displacement and positioning of heavy loads (2) in a transfer plane (T), extending parallel to the loading bed (1), the bearing device comprising:
   a profile (20a-c) equipped with balls (30) and displacement means (40a-c) for displacing the balls (30) between a working position, in which the balls (30) project from the profile to support the load (2), and a resting position, in which the balls (30) are retracted within the profile and do not support the load (2),
   each ball (30) being attached to a housing (21a-c) in the profile (20a-c) by a guide and sealing ring (50) having a spherical cavity (53) that captively mates with an exterior surface of the ball (30) and covering an area that extends from either side of a median transverse plane of the ball (30) to captively retain and maintain the respective ball (30) in position relative to the housing (21a-c), and
   the guide and sealing ring (50) comprises a means for forming a seal between both the ball (30) and the housing (21a-c) and moving along with the ball (30) when the ball (30) moves to and fro between the working position and the resting position.

2. The device according to claim 1, wherein the guide and sealing ring (50) comprises integrated sealing means including raised peripheral areas.

3. The device according to claim 1, wherein the guide and sealing ring (50) comprises attached sealing means including seals (51, 52).

4. The device according to claim 1, wherein the guide and sealing ring (50) is secured inside the housing (21a-c) so there is play allowing the guide and sealing ring (50) to be axially displaced relative to the housing (21a-c) by the displacement means (40a-c) and the housing (21a-c) comprises at least a first axial stop (22) to limit axially displacement of the guide and sealing ring (50) in a direction toward the working position.

5. The device according to claim 1, wherein the guide and sealing ring (50) is made of a single piece of flexible material and the ball (30) is retained inside the guide and sealing ring (50) by deforming the guide and sealing ring (50) and inserting the ball (30) within the guide and sealing ring (50).

6. The device according to claim 1, wherein the guide and sealing ring (50) is made of rigid material which comprises at least two parts assembled together from opposed sides of the ball (30).

7. The device according to claim 1, wherein the device comprises, for each ball (30), a bearing guide (60a-b) attached directly inside the housing (21a-b) of the profile (20a-b) and designed to move in axial translation under an influence of the displacement means (40a-b), the bearing guide (60a-b) being has a cup (61) to guide the ball (30) in rotation using a bed of small balls (62) traveling in an area defined by the ball (30), the bearing guide (60a-b), the guide and sealing ring (50), and the housing (21a-b).

8. The device according to claim 7, wherein the housing (21a-b) comprises at least a second axial stop (23) to limit axially displacement of the bearing guide (60*a-b*) in a direction toward the working position of its exit.

9. The device according to claim 7, wherein the displacement means (40*a*) is mechanical and comprises spring elements (41), in each housing (21*a*), for urging the ball (30) into the working position.

10. The device according to claim 7, wherein the displacement means (40*b*) is hydraulic and comprise, in each housing 21(*b*), a chamber (42) supplied with pressurized fluid in which a piston (43) is displaced, cooperating with the bearing guide (60*b*) so as to urge the ball (30) into the working position.

11. The device according to claim 10, wherein the device further comprises a hydraulic circuit (44), which is connected to a supply of pressurized fluid and communicates with each of the chambers (42).

12. The device according to claim 10, wherein the pistons (43, 46) have a diameter that is generally equal to a diameter of the ball (30).

13. The device according to claim 1, wherein the displacement means (40*c*) are hydraulic and designed to guide the balls (30) during rotation on a bed of fluid.

14. The device according to claim 13, wherein the displacement means (40*c*) comprises, in each housing (21*c*), a piston (46) defining along with the ball (30) a chamber (47) supplied with pressurized fluid to create the bed of fluid.

15. The device according to claim 14, wherein the displacement means (40*c*) comprises a valve (70) for controlling the pressure of the fluid inside the chambers (47).

16. The device according to claim 15, wherein the valve (70) is located in an upstream piston (46) and the bearing device further comprises a hydraulic circuit connected to a supply of pressurized fluid communicating with all the chambers (47) by means of the valve (70).

17. The device according to claim 16, wherein the valve (70) comprises a clapper (74) attached in an interior channel (49) of the upstream piston (46) and caused to open by the corresponding ball (30) in the resting position.

18. A loading bed (1) in which retractable bearing devices (10*a-b*) are mounted in grooves (3) to facilitate at least one of displacement and positioning of heavy loads (2) in a transfer plane (T), which is parallel to the loading bed (1), the bearing devices comprising:

profiles (20*a-b*) equipped with balls (30) and displacement means (40*a-b*) for displacing the balls (30) between a working position, in which the balls (30) project from the profile to support the load (2), and a resting position, in which the balls (30) are retracted within the profile and do not support the load (2), each ball (30) being retained within a housing (21*a-b*) in the profile (20*a-b*) by a guide and sealing ring (50) having a spherical cavity (53) that captively mates with an exterior surface of the ball (30) and covering an area that extends from either side of a median transverse plane of the ball (30) to captively retain and maintain the respective ball (30) in position relative to the housing (21*a-b*), and the guide and sealing ring (50) forming a first seal, between the ball (30) and the guide and sealing ring (50), and a second seal, between the guide and sealing ring (50) and the housing (21*a-b*), so that when the ball (30) moves to and fro between the working position and the resting position, the guide and sealing ring (50) move in unison with the ball (30), and the profiles (20*a-b*) of the retractable bearing devices (10*a-b*) being fixed relative to the loading bed (1).

19. A loading bed (1) in combination with retractable bearing devices (10*c*) to facilitate at least one of displacement and positioning of heavy loads (2) in a transfer plane (T), which is parallel to the loading bed (1), the bearing devices comprising:

profiles (20*c*) equipped with balls (30) and displacement means (40*c*) for displacing the balls (30) between a working position, in which the balls (30) project from the profile to support the load (2), and a resting position, in which the balls (30) are retracted within the profile and do not support the load (2), each ball (30) being retained within a housing (21*c*) in the profile (20*c*) by a guide and sealing ring (50) having a spherical cavity (53) that captive mates with an exterior surface of the ball (30) and covering an area that extends from either side of a median transverse plane of the ball (30) to captively retain and maintain the ball (30) in position relative to the housing (21*c*), and the guide and sealing ring (50) forming a first seal, between the ball (30) and the guide and sealing ring (50), and a second seal, between the guide and sealing ring (50) and the housing (21*a-b*), so that when the ball (30) moves to and fro between the working position and the resting position, the guide and sealing ring (50) move in unison with the ball (30), the profiles (20*c*) of the retractable bearing devices (10*c*) being fixed relative to the loading bed (1), the profiles (20*c*) of the retractable bearing devices (10*c*) being movable relative to the loading bed (1) in a perpendicular direction to a surface (S) of the bed.

\* \* \* \* \*